(12) United States Patent
Nagaoka

(10) Patent No.: US 12,401,226 B2
(45) Date of Patent: Aug. 26, 2025

(54) POWER TRANSMITTER

(71) Applicant: IHI Corporation, Tokyo (JP)

(72) Inventor: Shiro Nagaoka, Tokyo (JP)

(73) Assignee: IHI CORPORATION, Tokyo (JP)

( * ) Notice: Subject to any disclaimer, the term of this patent is extended or adjusted under 35 U.S.C. 154(b) by 300 days.

(21) Appl. No.: 17/767,538

(22) PCT Filed: Nov. 26, 2020

(86) PCT No.: PCT/JP2020/044032
§ 371 (c)(1),
(2) Date: Apr. 8, 2022

(87) PCT Pub. No.: WO2021/166356
PCT Pub. Date: Aug. 26, 2021

(65) Prior Publication Data
US 2024/0079907 A1  Mar. 7, 2024

(30) Foreign Application Priority Data
Feb. 18, 2020 (JP) .................. 2020-025538

(51) Int. Cl.
*H02J 50/12* (2016.01)
*B60L 53/122* (2019.01)
*H02J 50/80* (2016.01)

(52) U.S. Cl.
CPC ............ *H02J 50/12* (2016.02); *B60L 53/122* (2019.02); *H02J 50/80* (2016.02)

(58) Field of Classification Search
CPC .......... H02J 50/12; H02J 50/82; B60L 53/122

USPC .................................................. 320/107, 108
See application file for complete search history.

(56) References Cited

U.S. PATENT DOCUMENTS

| | | | |
|---|---|---|---|
| 2012/0153894 A1* | 6/2012 | Widmer | B60L 53/126 320/108 |
| 2013/0154382 A1 | 6/2013 | Kurata et al. | |
| 2014/0008969 A1* | 1/2014 | Kanahara | H04B 15/04 307/9.1 |
| 2018/0342878 A1* | 11/2018 | Nagaoka | H02J 50/80 |

(Continued)

FOREIGN PATENT DOCUMENTS

| | | |
|---|---|---|
| JP | 2012-135127 A | 7/2012 |
| JP | 2013-102643 A | 5/2013 |

(Continued)

*Primary Examiner* — Nathaniel R Pelton
(74) *Attorney, Agent, or Firm* — Volpe Koenig

(57) ABSTRACT

A power transmitter includes: a first coil that wirelessly transmits the electric power to a second coil of a power receiver; a converter including a DC/AC converter that converts DC electric power into AC electric power and supplies the AC electric power to the first coil; and a controller that brings a power value of the DC electric power or the AC electric power close to a power command value by frequency control of changing a frequency of the AC electric power. The controller performs, when the frequency at which the power value reaches the power command value is included in a used frequency band used by another device, frequency change process of changing the frequency so that the frequency becomes a frequency different from the used frequency band while performing constant power control of maintaining a state in which the power value matches the power command value.

6 Claims, 10 Drawing Sheets

(56) References Cited

U.S. PATENT DOCUMENTS

2019/0006836 A1    1/2019   Danilovic et al.
2019/0006885 A1    1/2019   Danilovic

FOREIGN PATENT DOCUMENTS

| | | |
|---|---|---|
| JP | 2013-128400 A | 6/2013 |
| JP | 2014-014225 A | 1/2014 |
| JP | 2014-507103 A | 3/2014 |
| JP | 6084240 B2 | 2/2017 |
| JP | 2017-060324 A | 3/2017 |
| JP | 2017-070035 A | 4/2017 |
| WO | 2014/118972 A1 | 8/2014 |
| WO | 2017/047454 A1 | 3/2017 |

* cited by examiner

POWER TRANSMITTER

TECHNICAL FIELD

The present disclosure relates to a power transmitter.

BACKGROUND ART

A wireless power transfer system that wirelessly transmits electric power is known. The wireless power transfer system includes a power transmitter including a power transmission coil and a power receiver including a power reception coil, and realizes power transmission in a wireless manner by utilizing electromagnetic induction or magnetic resonance between these coils. When a frequency used for power transmission (switching frequency of an inverter) interferes with a frequency used by another device, noise or the like may affect the other device due to power transmission.

In the wireless power transfer device described in Patent Literature 1, when an inverter frequency corresponding to an output command value (power command value) overlaps with a used frequency band used by another device, the inverter frequency is corrected so as not to overlap with the used frequency band, and a power factor correction (PFC) output is adjusted so as to obtain an output power value corresponding to the power command value.

CITATION LIST

Patent Literature

Patent Literature 1: WO 2014/118972 A

SUMMARY OF INVENTION

Technical Problem

In the wireless power transfer device described in Patent Literature 1, after the inverter frequency is caused to match a frequency corresponding to the power command value, if the inverter frequency overlaps with the used frequency band, the inverter frequency is corrected so as not to overlap with the used frequency band. Then, the PFC output is increased by the amount of decrease in the output electric power due to the change in the inverter frequency, and the output power value is caused to match the power command value. Therefore, it may take a long time for the output power value to match the power command value.

The present disclosure describes a power transmitter capable of reducing the time required for the power value of target electric power to match a power command value while suppressing interference with other devices.

Solution to Problem

A power transmitter according to one aspect of the present disclosure is a device for supplying electric power to a power receiver connected to a load. The power transmitter includes: a first coil that wirelessly transmits the electric power to a second coil of the power receiver; a converter including a DC/AC converter that converts DC electric power into AC electric power and supplies the AC electric power to the first coil; and a controller that brings a power value of target electric power close to a power command value by frequency control of changing a frequency of the AC electric power. The target electric power is the DC electric power or the AC electric power. The controller performs, when the frequency at which the power value reaches the power command value is included in a used frequency band used by another device, frequency change process of changing the frequency so that the frequency becomes a frequency different from the used frequency band while performing constant power control of maintaining a state in which the power value matches the power command value.

Effects of Invention

According to the present disclosure, it is possible to shorten the time required for the power value of the target electric power to match the power command value while suppressing interference with other devices.

DESCRIPTION OF EMBODIMENTS

[1] Outline of Embodiment

Figure 1:
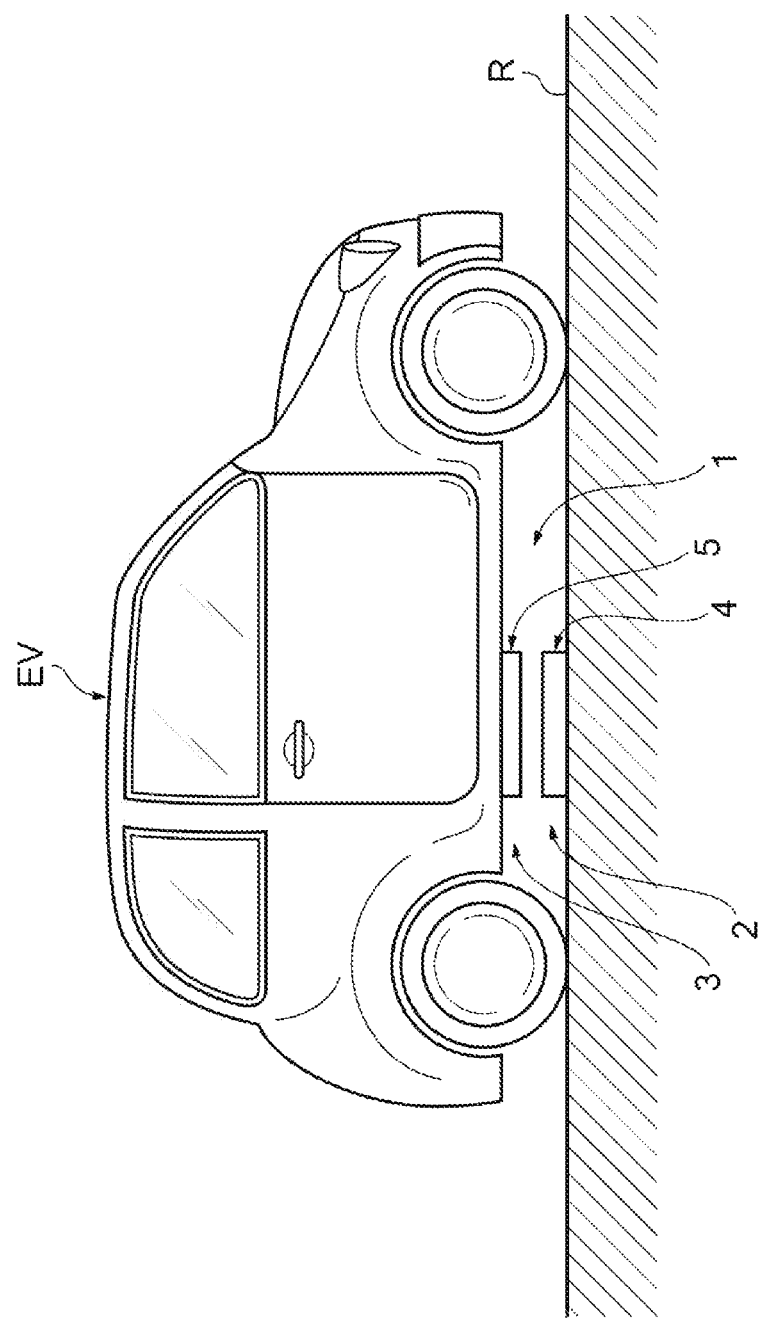
FIG. 1 is a diagram showing an application example of a wireless power transfer system including a power transmitter according to an embodiment.

A power transmitter according to one aspect of the present disclosure is a device for supplying electric power to a power receiver connected to a load. The power transmitter includes: a first coil that wirelessly transmits the electric power to a second coil of the power receiver; a converter including a DC/AC converter that converts DC electric power into AC electric power and supplies the AC electric power to the first coil; and a controller that brings a power value of target electric power close to a power command value by frequency control of changing a frequency of the AC electric power. The target electric power is the DC electric power or the AC electric power. The controller performs, when the frequency at which the power value reaches the power command value is included in a used frequency band used by another device, frequency change process of changing the frequency so that the frequency becomes a frequency different from the used frequency band while performing constant power control of maintaining a state in which the power value matches the power command value.

In the power transmitter, the frequency change process is performed in a case where the frequency of the AC electric power when the power value of the target electric power reaches the power command value is included in the used frequency band used by another device. In the frequency change process, the frequency of the AC electric power is changed so that the frequency of the AC electric power becomes a frequency different from the used frequency band while performing constant power control of maintaining a state in which the power value of the target electric power matches the power command value. In this way, once the power value of the target electric power reaches the power command value, the state in which the power value of the target electric power matches the power command value is maintained. Therefore, even if the frequency of the AC electric power is changed after the power value of the target electric power reaches the power command value, the power value of the target electric power matches the power command value. As a result, it is possible to shorten the time required for the power value of the target electric power to match the power command value while suppressing interference with other devices.

The controller may perform the frequency change process by performing at least one of voltage control of changing a voltage of the DC electric power, phase shift control of the DC/AC converter, and impedance control of controlling an impedance between the DC/AC converter and the first coil together with the frequency control. When the voltage of the DC electric power, the phase shift amount of the DC/AC converter, or the impedance between the DC/AC converter and the first coil is changed, the frequency characteristic of the target electric power is changed. Therefore, the frequency of the AC electric power is changed in order to maintain a state in which the power value of the target electric power matches the power command value. This makes it possible to set the frequency of the AC electric power to a frequency different from the used frequency band.

The controller may perform the frequency change process by performing the voltage control together with the frequency control. When the voltage of the DC electric power is changed, the frequency characteristic of the target electric power is changed. Therefore, the frequency of the AC electric power is changed in order to maintain a state in which the power value of the target electric power matches the power command value. This makes it possible to set the frequency of the AC electric power to a frequency different from the used frequency band.

The controller may perform the voltage control by increasing the voltage. In this case, since the voltage of the DC electric power is adjusted in order from a lower voltage, it is possible to lower the voltage of the DC electric power when the frequency of the AC electric power is changed to a frequency different from the used frequency band. As a result, the power transfer efficiency between the first coil and the second coil can be improved.

The controller may perform the frequency change process by performing the phase shift control together with the frequency control. When the phase shift amount of the DC/AC converter is changed, the frequency characteristic of the target electric power is changed. Therefore, the frequency of the AC electric power is changed in order to maintain a state in which the power value of the target electric power matches the power command value. This makes it possible to set the frequency of the AC electric power to a frequency different from the used frequency band.

The controller may perform the frequency change process by performing the impedance control together with the frequency control. When the impedance between the DC/AC converter and the first coil is changed, the frequency characteristic of the target electric power is changed. Therefore, the frequency of the AC electric power is changed in order to maintain a state in which the power value of the target electric power matches the power command value. This makes it possible to set the frequency of the AC electric power to a frequency different from the used frequency band.

The controller may control the converter to keep the voltage constant. In this case, since the voltage of the DC electric power is constant, the frequency change process can be performed without increasing the withstand voltage of the DC/AC converter. As a result, it is possible to suppress interference with other devices without increasing the size of the DC/AC converter.

The controller may select one of the voltage control and the phase shift control in accordance with the frequency when the power value reaches the power command value, and may perform the frequency change process by performing the selected control together with the frequency control. In this case, it is possible to shorten the time until the frequency of the AC electric power is set to a frequency different from the used frequency band. Since the adjustment range of the frequency of the AC electric power can be widened by using the voltage control and the phase shift control, it is possible to more reliably set the frequency of the AC electric power to a frequency different from the used frequency band.

The controller may select one of the voltage control and the impedance control in accordance with the frequency when the power value reaches the power command value, and may perform the frequency change process by performing the selected control together with the frequency control. In this case, it is possible to shorten the time until the frequency of the AC electric power is set to a frequency different from the used frequency band. Since the adjustment range of the frequency of the AC electric power can be widened by using the voltage control and the impedance control, it is possible to more reliably set the frequency of the AC electric power to a frequency different from the used frequency band.

The controller may lower the power command value when the controller cannot change the frequency to any frequency different from the used frequency band. In this case, the frequency of the AC electric power can be changed to a frequency different from the used frequency band by lowering the power command value. Therefore, it is possible to more reliably suppress interference with other devices.

[2] Examples of Embodiments

Hereinafter, embodiments of the present disclosure will be described in detail with reference to the accompanying drawings. In the description of the drawings, the same elements are denoted by the same reference numerals and redundant explanation is omitted.

FIG. 1 is a diagram showing an application example of a wireless power transfer system including a power transmitter according to an embodiment. As shown in FIG. 1, a wireless power transfer system 1 includes a power transmitter 2 and a power receiver 3, and is a system for supplying electric power from the power transmitter 2 to the power receiver 3. The power transmitter 2 and the power receiver 3 are separated from each other, for example, in a vertical direction. The power transmitter 2 is installed in a parking lot or the like, for example. The power receiver 3 is mounted on an electric vehicle EV, for example. The wireless power transfer system 1 is configured to supply electric power to the electric vehicle EV arriving at the parking lot or the like, using inter-coil magnetic coupling such as a magnetic field resonance method and an electromagnetic induction method. The wireless power transfer method is not limited to a method utilizing the magnetic coupling, but may be an electric field resonance method, for example.

The power transmitter 2 is a device that supplies electric power for wireless power transfer. The power transmitter 2 generates desired AC electric power from electric power supplied by a power source PS (see FIG. 2), and transmits the generated AC electric power to the power receiver 3. The power transmitter 2 is installed on a road surface R such as a parking lot. The power transmitter 2 includes a first coil device 4 (power transmission coil device) provided so as to protrude upward from the road surface R such as the parking lot. The first coil device 4 includes a first coil 21 (see FIG. 2), and has a flat frustum shape or a rectangular parallelepiped shape, for example. The power transmitter 2 generates the desired AC electric power from the power source PS. The generated AC electric power is transmitted to the first coil device 4, so that the first coil device 4 generates a magnetic flux.

Figure 2:
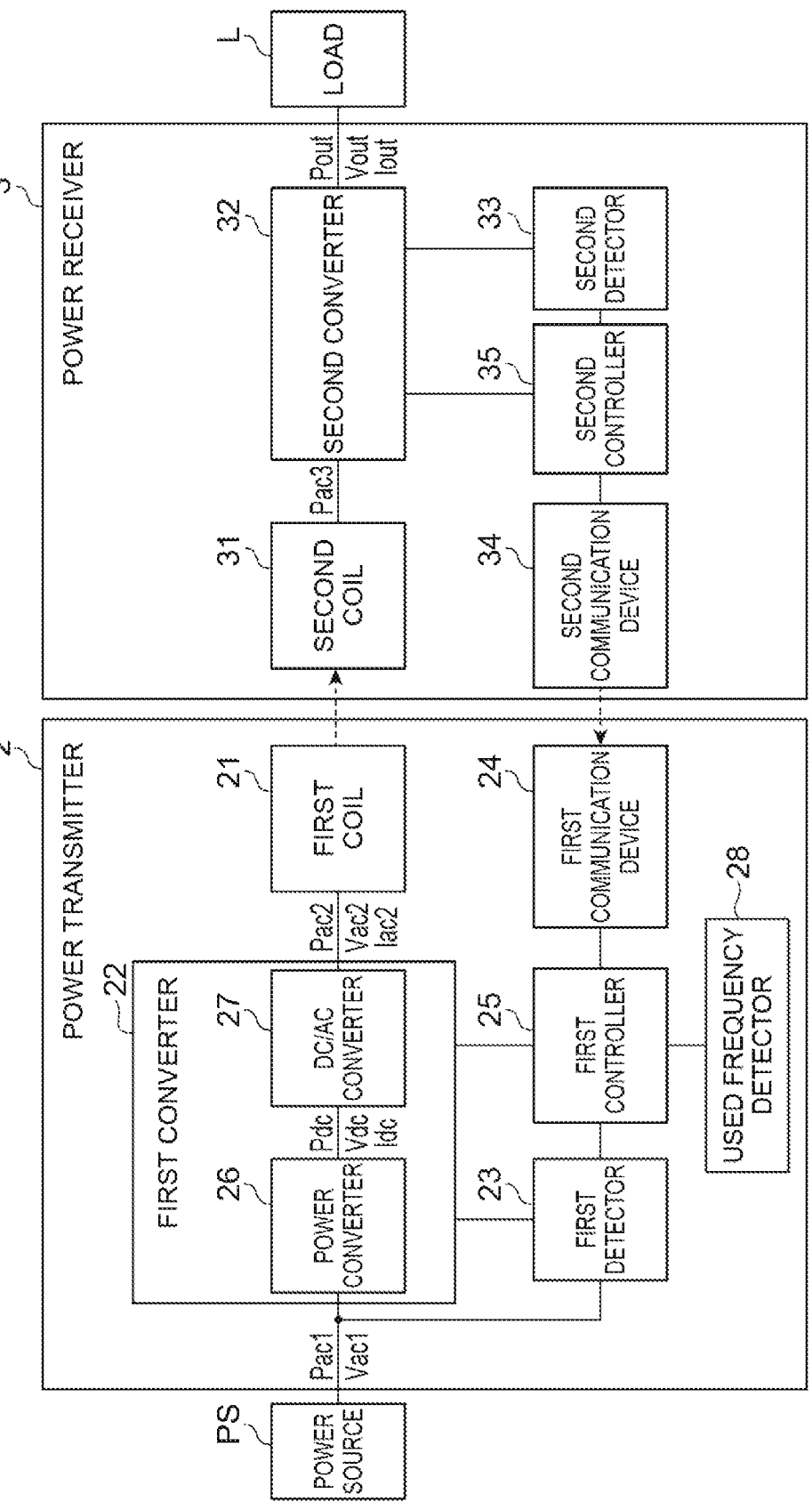
FIG. 2 is a circuit block diagram of the wireless power transfer system of FIG. 1.

The power receiver 3 is a device that receives electric power from the power transmitter 2 and supplies electric power to a load L (see FIG. 2). The power receiver 3 is mounted on the electric vehicle EV, for example. The power receiver 3 includes, for example, a second coil device 5 (power receiving coil device) attached to a bottom surface of a vehicle body (chassis or the like) of the electric vehicle EV. The second coil device 5 includes a second coil 31 (see FIG. 2), and faces the first coil device 4 while being spaced apart from each other in a vertical direction when electric power is supplied. The second coil device 5 has, for example, a flat frustum shape or a rectangular parallelepiped shape. The magnetic flux generated in the first coil device 4 interlinks with the second coil device 5, so that the second coil device 5 generates an induced electric current. Thereby, the second coil device 5 receives electric power from the first coil device 4 in a wireless manner. The electric power received by the second coil device 5 is supplied to the load L.

With reference to FIG. 2, a circuit configuration of the wireless power transfer system 1 will be described in detail. FIG. 2 is a circuit block diagram of the wireless power transfer system of FIG. 1. As shown in FIG. 2, the wireless power transfer system 1 is a system for receiving AC electric power Pac1 from the power source PS and supplying load electric power Pout to the load L. The power source PS may be an AC electric power source such as a commercial power source, and supplies the AC electric power Pac1 to the power transmitter 2. A frequency of the AC electric power Pac1 is, for example, 50 Hz or 60 Hz. The load L may be a DC load such as a battery or an AC load such as an electric motor.

The power transmitter 2 is supplied with the AC electric power Pac1 from the power source PS. The power transmitter 2 includes the first coil 21, a first converter 22 (converter), a first detector 23, a first communication device 24, a first controller 25 (controller), and a used frequency detector 28.

The first converter 22 is a circuit that converts the AC electric power Pac1 supplied from the power source PS into desired AC electric power Pac2 and supplies the AC electric power Pac2 to the first coil 21. The first converter 22 can change a magnitude (power value) of the DC electric power Pdc and a magnitude (power value) of the AC electric power Pac2 by, for example, a frequency control, a phase shift control, and a voltage control of the DC electric power Pdc, which will be described later. The first converter 22 includes a power converter 26 and a DC/AC converter 27.

The power converter 26 is an AC/DC converter that converts the AC electric power Pac1 supplied from the power source PS into the DC electric power Pdc. The power converter 26 is, for example, a rectifier circuit. The rectifier circuit may be constituted by a rectifying element such as a diode or may be constituted by a switching element such as a transistor. The power converter 26 may further include a power factor correction (PFC) function and a step-up/step-down function. The first converter 22 may further include a DC/DC converter that is provided at an output of the power converter 26. The power converter 26 is controlled by the first controller 25 so as to change a magnitude of a voltage Vdc of the DC electric power Pdc. The power converter 26 changes the magnitude of the voltage Vdc of the DC electric power Pdc by pulse width modulation, for example. The power converter 26 supplies the DC electric power Pdc to the DC/AC converter 27.

The DC/AC converter 27 converts the DC electric power Pdc supplied from the power converter 26 into the AC electric power Pac2. A frequency of the AC electric power Pac2 is, for example, 81.38 kHz to 90 kHz. The DC/AC converter 27 includes, for example, an inverter circuit. The first converter 22 may further include a transformer that is provided at the output of the DC/AC converter 27. The DC/AC converter 27 is controlled by the first controller 25 so as to change the magnitudes of the DC electric power Pdc and the AC electric power Pac2. The DC/AC converter 27 supplies the AC electric power Pac2 to the first coil 21.

The first coil 21 is a coil for wirelessly transmitting electric power to (the second coil 31 of) the power receiver 3. The first coil 21 generates a magnetic flux by supplying the AC electric power Pac2 from the first converter 22 to the first coil 21. A capacitor and an inductor (for example, a reactor) may be connected between the first coil 21 and the first converter 22.

The first detector 23 includes a circuit for acquiring a measurement value relating to the DC electric power Pdc. The circuit for acquiring the measurement value relating to the DC electric power Pdc is, for example, a voltage sensor, a current sensor, or a combination thereof. The first detector 23 measures the DC electric power Pdc, the voltage Vdc of the DC electric power Pdc, or an electric current Idc of the DC electric power Pdc. The first detector 23 measures the AC electric power Pac2, a voltage Vac2 of the AC electric power Pac2, and an electric current Iac2 of the AC electric power Pac2. The first detector 23 outputs the acquired measurement value to the first controller 25.

The first communication device 24 is a circuit for wirelessly communicating with a second communication device 34 of the power receiver 3 to be described later. The first communication device 24 includes, for example, an antenna for a communication system using radio waves, or a light emitting element and a light receiving element for a communication system using an optical signal. The first communication device 24 outputs the information received from the power receiver 3 to the first controller 25.

The first controller 25 is a processing device such as a central processing unit (CPU) and a digital signal processor (DSP). The first controller 25 may include a read only memory (ROM), a random access memory (RAM), an interface circuit connected to each part of the power transmitter 2, and the like.

The first controller 25 performs constant power control to bring the power value of the target electric power close to the first power command value (power command value). As the target electric power, the DC electric power Pdc or the AC electric power Pac2 may be used. The first controller 25 calculates the first power measurement value based on the measurement value of the electric current Idc detected by the first detector 23. When the target electric power is the DC electric power Pdc, the first power measurement value is a measurement value including a loss of the DC/AC converter 27, a loss of the first coil 21, and the like and the AC electric power Pac2 supplied from the DC/AC converter 27 to the first coil 21. The first controller 25 calculates the first power command value, which is a target value of the DC electric power Pdc, based on a second power command value received from the power receiver 3 via the first communication device 24. As the constant power control, the first controller 25 performs the power control that controls the first converter 22 based on the first power measurement value and the first power command value so that the first power measurement value (DC electric power Pdc) approaches the first power command value.

When the target electric power is the AC electric power Pac2, the first power command value is a target value of the AC electric power Pac2 and is set in accordance with the AC electric power Pac2. That is, as the constant power control, the first controller 25 controls the first converter 22 so that the AC electric power Pac2 approaches the first power command value, which is the target value of the AC electric power Pac2. Hereinafter, a case where the target electric power is the DC electric power Pdc will be described.

The first controller 25 may perform a command value correction control for correcting the first power command value. As the command value correction control, the first controller 25 performs the power control that controls the first converter 22 based on the second power measurement value (described later) and the second power command value (described later) received from the power receiver 3 via the first communication device 24 so that the second power measurement value (load electric power Pout) approaches the second power command value. Specifically, the first controller 25 corrects the first power command value so that the second power measurement value approaches the second power command value.

As the power control, the first controller 25 controls the magnitude (power value) of the DC electric power Pdc and the magnitude (power value) of the AC electric power Pac2 by controlling the first converter 22 and controls the magnitude of the load electric power Pout supplied to the load L. The power control is performed using at least one of the frequency control, the phase shift control, and the voltage control of the DC electric power Pdc. In each control, a power control parameter for controlling the magnitudes of the DC electric power Pdc and the AC electric power Pac2 is changed.

Figure 3:
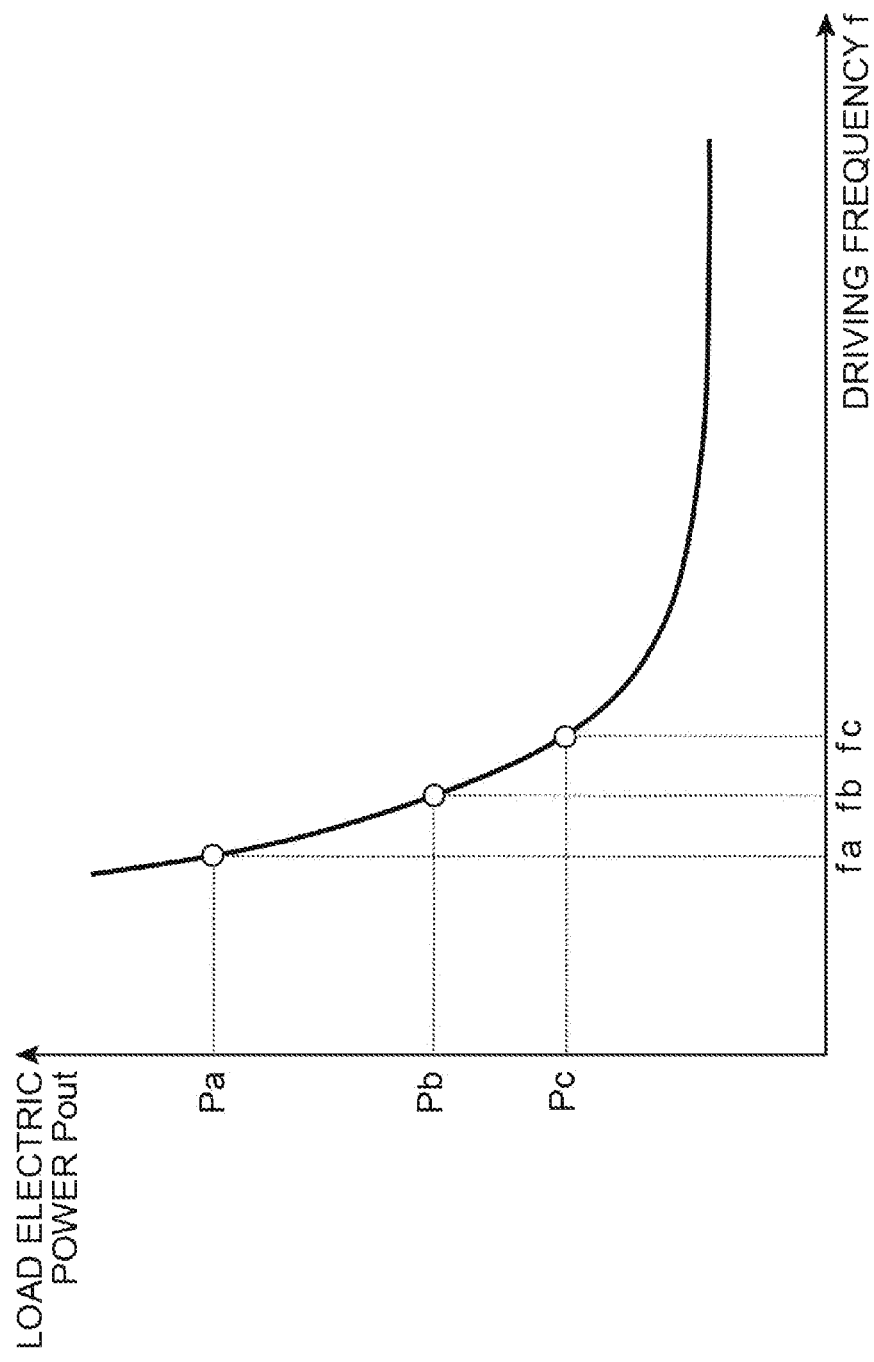
FIG. 3 is a diagram showing a frequency characteristic of load electric power.

Here, the frequency control will be described with reference to FIG. 3. FIG. 3 is a diagram showing a frequency characteristic of load electric power. A horizontal axis of a graph in FIG. 3 indicates the driving frequency f, and a vertical axis thereof indicates (the magnitude of) the load electric power Pout. The driving frequency f is the frequency of the AC electric power Pac2. The frequency of the AC electric power Pac2 refers to a frequency of the AC electric current or the AC voltage that is output from the first converter 22. Hereinafter, the frequency of the AC electric power Pac2 may be referred to as "driving frequency f". As shown in FIG. 3, the magnitudes of the DC electric power Pdc, the AC electric power Pac2, and the load electric power Pout are changed with the driving frequency f. As the driving frequency f, for example, 81.38 kHz to 90 kHz are available. As the driving frequency f is changed, an impedance of a reactance element such as the coil and the capacitor is changed, whereby the magnitudes of the DC electric power Pdc, the AC electric power Pac2, and the load electric power Pout are changed. Hereinafter, in present embodiment, as the driving frequency f increases, the magnitudes of the DC electric power Pdc, the AC electric power Pac2, and the load electric power Pout decrease. The first controller 25 performs the frequency control that changes the magnitudes (power values) of the DC electric power Pdc, the AC electric power Pac2, and the load electric power Pout by changing the driving frequency f. In the frequency control, the above-described power control parameter is the driving frequency f of the DC/AC converter 27 (inverter circuit).

For example, it is assumed that the driving frequency f is initially a frequency fb. The load electric power Pout at this time is an electric power Pb. Here, for example, the driving frequency f is reduced from the frequency fb to a frequency fa. Then, the load electric power Pout becomes an electric power Pa corresponding to the driving frequency f=fa. Therefore, the load electric power Pout increases from the electric power Pb to the electric power Pa. On the other hand, the driving frequency f is increased from the frequency fb to a frequency fc. Then, the load electric power Pout becomes an electric power Pc corresponding to the driving frequency f=fc. Therefore, the load electric power Pout decreases from the electric power Pb to the electric power Pc.

The first controller 25 brings the load electric power Pout closer to a desirable electric power by changing the driving frequency f as described above. In the control that actually changes (increases and decreases) the driving frequency f, the driving frequency f may be changed by steps. The size of one step for changing the driving frequency f is not particularly limited, and may be, for example, about several hertz to several tens of hertz or several tens of hertz to several hundreds of hertz. The steps may be determined, for example, by a clock resolution of the CPU, which is the first controller 25.

A specific procedure of the frequency control is not limited. For example, in a case where the DC/AC converter 27 is an inverter circuit, the first controller 25 adjusts the switching frequency of each switching element using the driving signal that is supplied to each of the switching elements included in the inverter circuit to change the driving frequency f. As the switching element, for example, a field effect transistor (FET) and an insulated gate bipolar transistor (IGBT) are used. In this case, the driving signal is applied to a gate of the switching element.

Figure 4:
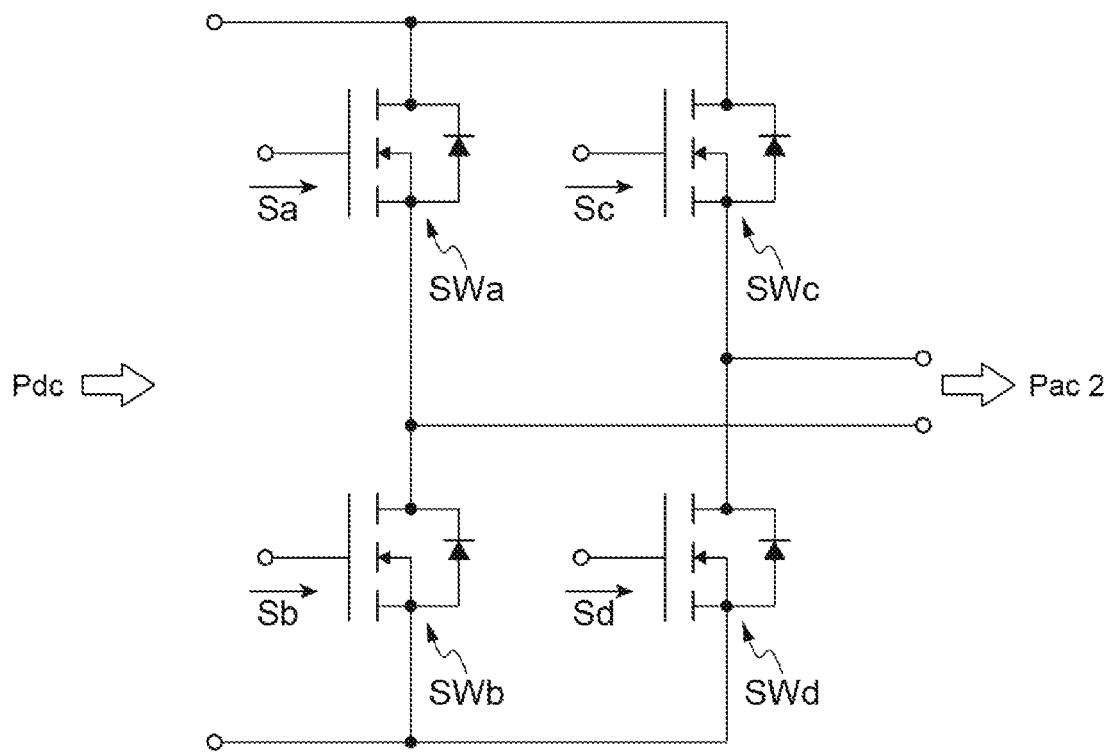
FIG. 4 is a diagram showing an example of a circuit configuration of a DC/AC converter.

Next, the phase shift control will be described. The first controller 25 performs the phase shift control that changes the magnitudes (power values) of the DC electric power Pdc, the AC electric power Pac2, and the load electric power Pout by changing the phase shift amount of the DC/AC converter 27 (inverter circuit). For example, in a case where the DC/AC converter 27 is an inverter circuit as shown in FIG. 4, the first controller 25 adjusts the supply times of the driving signals Sa to Sd to the switching elements SWa to SWd included in the inverter circuit to adjust the time in which each of the switching elements SWa to SWd is turned on.

When a driving time of the switching element SWa and a driving time of the switching element SWd are the same and a driving time of the switching element SWb and a driving time of the switching element SWc are the same, an energization period (ON period) of the inverter circuit is longest. The ON period of the inverter circuit becomes shorter as the driving time of the switching element SWa and the driving time of the switching element SWd are shifted (the driving time of the switching element SWb and the driving time of the switching element SWc are shifted). As the ON period of the inverter circuit becomes shorter, the DC electric power Pdc and the AC electric power Pac2 become smaller. The above-described power control parameter in the phase shift control is a phase shift amount. The phase shift amount is a shift amount between the driving time of the switching element SWa and the driving time of the switching element SWd (or a shift amount between the driving time of the switching element SWb and the driving time of the switching element SWc). In other words, the above-described power control parameter in the phase shift control is the ON period of the inverter circuit.

In order to realize soft switching of the inverter circuit, it is necessary that the phase of the output voltage (the voltage Vac2 of the AC electric power Pac2) from the inverter circuit is the same as or leads the phase of the output electric current (the electric current Iac2 of the AC electric power Pac2) (the impedance of the entire load viewed from the inverter circuit is inductive). Here, in the present embodiment, the impedance of the entire load viewed from the inverter circuit (DC/AC converter 27) is the sum of the impedances of the first coil 21, the second coil 31, a second converter 32, and the load L. If the phase difference between the voltage and the electric current is kept the same, the impedance of the entire load viewed from the inverter circuit becomes capacitive due to noise, control error, and the like. When the phase of the output electric current (the electric current Iac2 of the AC electric power Pac2) from the inverter circuit leads the phase of the output voltage (the voltage Vac2 of the AC electric power Pac2), the impedance of the entire load viewed from the inverter circuit is capacitive. Therefore, in order to ensure safety, the phase of the voltage leads the phase of the electric current so that the phase difference does not become smaller than a predetermined value. This predetermined value is referred to as a phase margin.

For example, the phase shift amount may be expressed in a percentage in which a duration of one cycle of the AC power Pac2 (that is, 360 degrees) is 100%. In this case, the phase shift amount is 0% in a state in which no phase shift is performed. In the phase shift control, when the phase shift amount is 0%, the DC electric power Pdc and the AC electric power Pac2 are maximized and the load electric power Pout is also maximized. The maximum value of the phase shift amount varies depending on the circuit characteristics of the first coil 21 (for example, characteristics of a resonance circuit including the first coil 21 and a capacitor (not shown)), but is, for example, about 50%. That is, in one aspect, the lower limit value of the phase shift amount may be set to 0%. The upper limit value of the phase shift amount may be set to 50%.

Next, the voltage control of the DC electric power Pdc will be described. The first controller 25 performs the voltage control that changes the magnitudes (power values) of the DC electric power Pdc, the AC electric power Pac2, and the load electric power Pout by changing the magnitude of the voltage Vdc of the DC electric power Pdc. The voltage Vdc of the DC electric power Pdc is changed by using, for example, the step-up/step-down function of the power converter 26 described above. For example, as the voltage Vdc of the DC electric power Pdc increases, the DC electric power Pdc and the AC electric power Pac2 also increase, and as the voltage Vdc of the DC electric power Pdc decreases, the DC electric power Pdc and the AC electric power Pac2 also decrease. Therefore, the above-described power control parameter in the voltage control of the DC electric power Pdc is the magnitude of the voltage Vdc of the DC electric power Pdc. The step-up/step-down function can be realized by, for example, a chopper circuit.

The used frequency detector 28 is a circuit that detects a used frequency band, which is a frequency band used by another device different from the wireless power transfer system 1. The used frequency detector 28 detects a used frequency band by automatic scanning in the same manner as automatic tuning of a radio, for example. The used frequency detector 28 may acquire positional information of the power transmitter 2 using a global positioning system (GPS) or the like, and detect, as the used frequency band, an allocated frequency band allocated to another device in an area including the position indicated by the positional information. The allocated frequency band for each area is set in advance in a memory (not shown). The used frequency detector 28 may use a harmonic component of the detected frequency band as the used frequency band. The used frequency detector 28 outputs used frequency information indicating a used frequency band to the first controller 25. Alternatively, the user may set used frequencies in the first controller 25. In this case, the power transmitter 2 may not include the used frequency detector 28.

The power receiver 3 includes the second coil 31, the second converter 32, a second detector 33, the second communication device 34, and a second controller 35.

The second coil 31 is a coil for receiving power wirelessly supplied from the power transmitter 2. The magnetic flux generated by the first coil 21 interlinks with the second coil 31 to generate AC electric power Pac3 in the second coil 31. The second coil 31 supplies the AC electric power Pac3 to the second converter 32. A capacitor and an inductor (for example, a reactor) may be connected between the second coil 31 and the second converter 32.

The second converter 32 is a circuit that converts the AC electric power Pac3 supplied from the second coil 31 into the desired load electric power Pout for the load L. When the load L is a DC load, the second converter 32 is an AC/DC converter (rectifier circuit) that converts the AC electric power Pac3 into the DC load electric power Pout. In this case, the second converter 32 may include a step-up/step-down function for outputting the desired load electric power Pout for the load L. The step-up/step-down function can be realized by, for example, a chopper circuit or a transformer. The second converter 32 may further include a transformer that is provided at the input of the AC/DC converter.

When the load L is an AC load, the second converter 32 further includes a DC/AC converter (inverter circuit) in addition to an AC/DC converter that converts the AC electric power Pac3 into DC electric power. The DC/AC converter converts the DC electric power generated by the AC/DC converter into AC load electric power Pout. The second converter 32 may further include a transformer that is provided at the input of the AC/DC converter. When the AC electric power Pac3 supplied from the second coil 31 is the desired AC electric power for the load L, the second converter 32 can be omitted.

The second detector 33 is a circuit for acquiring the measurement value relating to the load electric power Pout supplied to the load L. The second detector 33 measures a load voltage Vout, a load electric current Iout, or the load electric power Pout supplied to the load L. The second detector 33 is, for example, a voltage sensor, a current sensor, or a combination thereof. The second detector 33 outputs the acquired measurement value to the second controller 35. The load L outputs the second power command value to the second controller 35. The second power command value indicates the magnitude of the desired electric power to be supplied to the load L. For example, when the load L is a storage battery, the second power command value may be a command value of electric current, voltage, or electric power which is set in accordance with a state of charge (SOC) of the load L.

The second communication device 34 is a circuit for wirelessly communicating with the first communication device 24 of the power transmitter 2. The power receiver 3 can communicate with the power transmitter 2 by the second communication device 34. The second communication device 34 includes, for example, an antenna for a communication system using radio waves, or a light emitting element and a light receiving element for a communication system using an optical signal. The second communication device 34 transmits the information received from the second controller 35 to the power transmitter 2.

The second controller 35 is a processing device such as a CPU and a DSP. The second controller 35 may include a ROM, a RAM, an interface circuit connected to each unit of the power receiver 3, and the like. The second controller 35 calculates the second power measurement value based on the measurement value received from the second detector 33. The second controller 35 transmits the second power measurement value and the second power command value received from the load L to the power transmitter 2 via the second communication device 34.

For example, when a storage battery of an electric vehicle is connected to the power transmitter 2 instead of the power source PS, and the power source PS is connected to the power receiver 3 instead of the load L, electric power can be transmitted from the power receiver 3 to the power transmitter 2.

Figure 5:
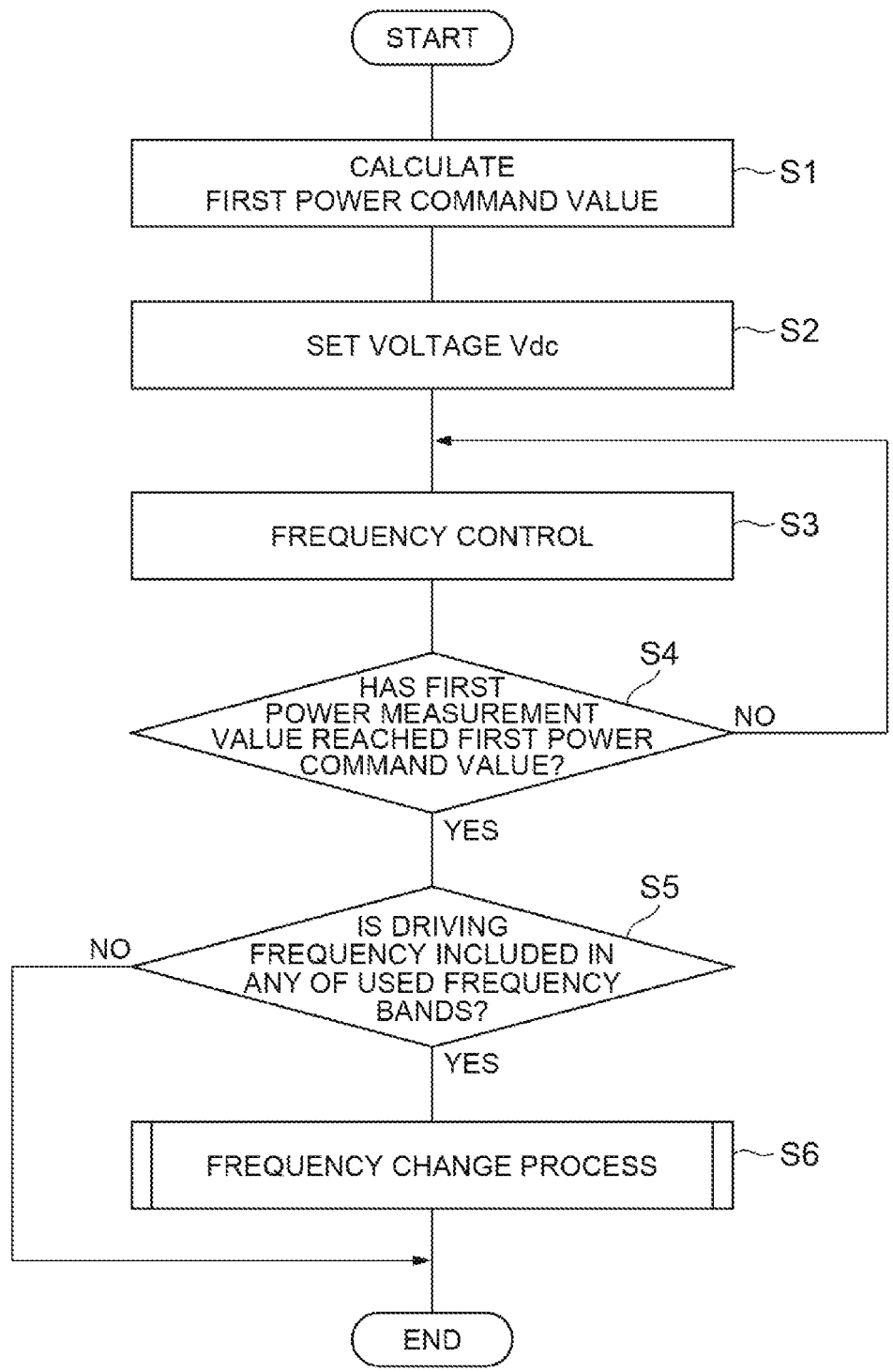
FIG. 5 is a flowchart showing a series of processes of power control performed by the first controller shown in FIG. 2.
Figure 6:
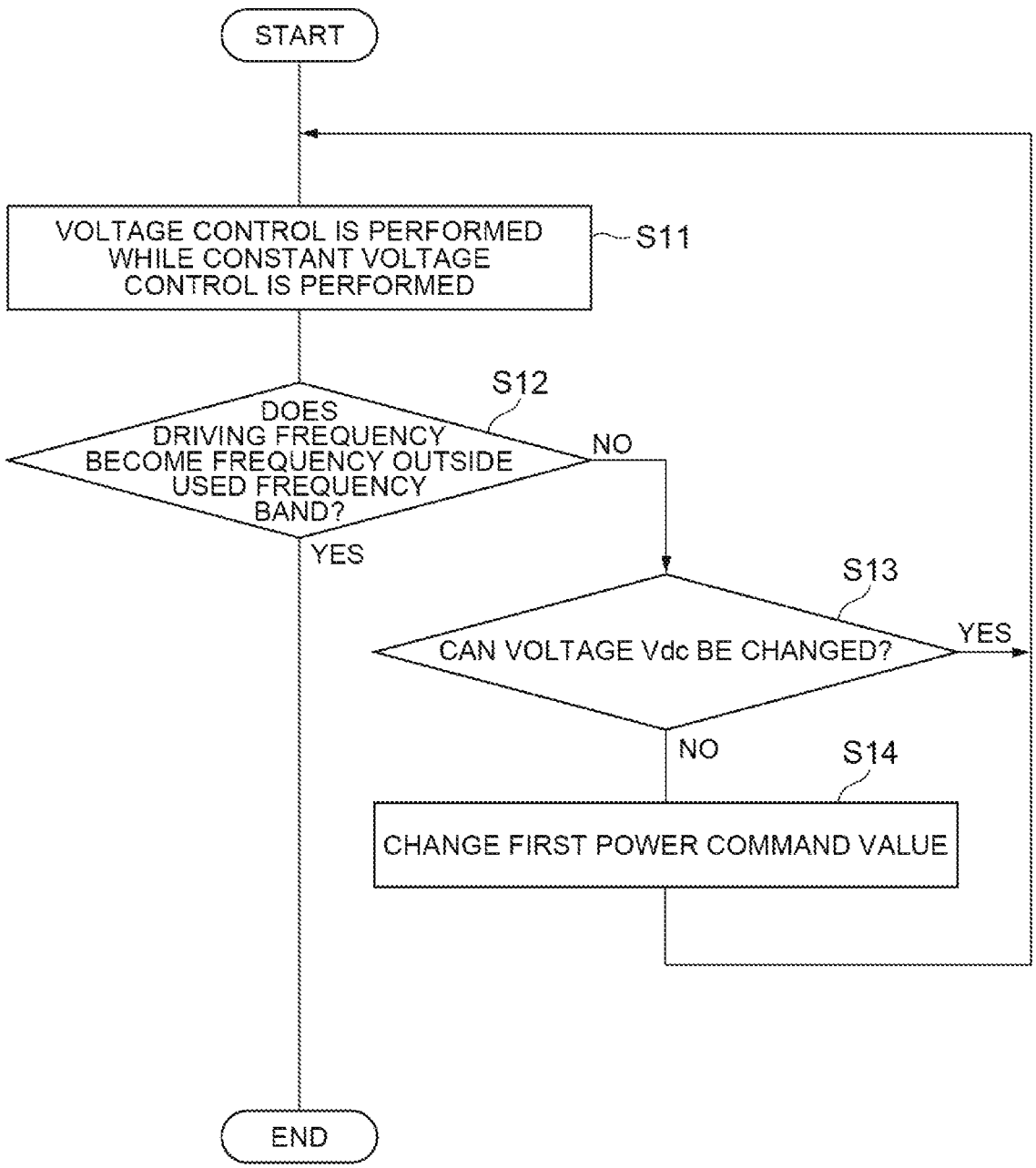
FIG. 6 is a flowchart showing an example of the frequency change process of FIG. 5 in detail.
Figure 7:
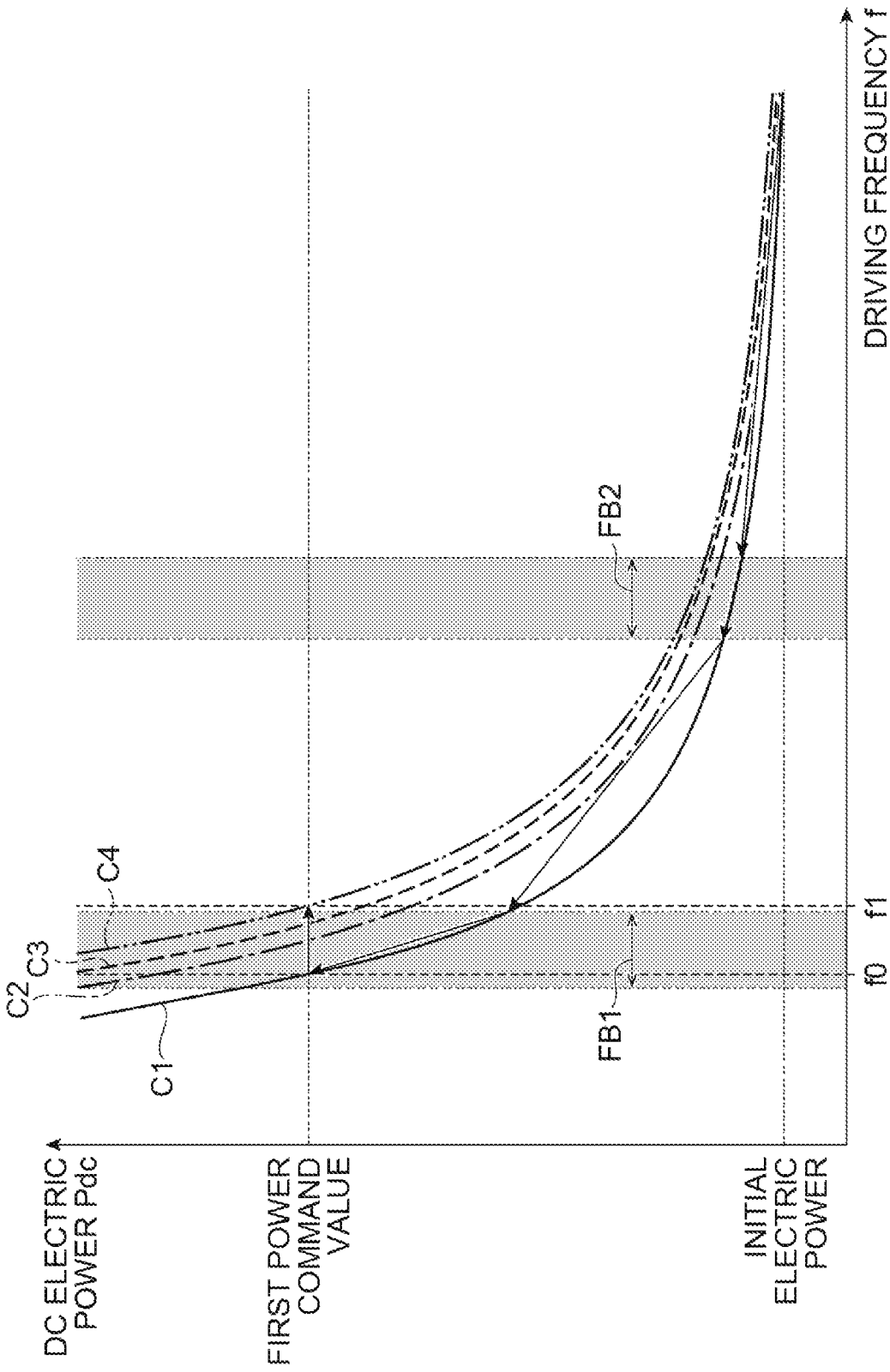
FIG. 7 is a diagram for describing the power control of FIG. 5.

Next, the power control will be described in detail with reference to FIGS. 5 to 7. FIG. 5 is a flowchart showing a series of processes of power control performed by the first controller shown in FIG. 2. FIG. 6 is a flowchart showing an example of the frequency change process of FIG. 5 in detail. FIG. 7 is a diagram for describing the power control of FIG. 5. The series of processes shown in FIG. 5 is started when the first controller 25 receives the second power command value from the power receiver 3.

First, the first controller 25 calculates the first power command value based on the second power command value received from the power receiver 3 (step S1). When the power receiver 3 transmits the second power measurement value to the power transmitter 2 together with the second power command value, the first controller 25 may correct the first power command value so that the second power measurement value approaches the second power command value. Here, a case where the first power measurement value (DC electric power Pdc) is smaller than the first power command value will be described, but the same applies to a case where the first power measurement value is larger than the first power command value. When the first power measurement value is equal to the first power command value, the subsequent processes are not performed, and the power control ends.

Subsequently, the first controller 25 sets the voltage Vdc (step S2). For example, when the power transmitter 2 is activated, the first controller 25 controls the power converter 26 so that the voltage Vdc becomes the minimum voltage in the voltage range of the voltage Vdc that can be output by the power converter 26. The first controller 25 may control the power converter 26 so that the voltage Vdc becomes a predetermined voltage (for example, 420V). When the power transmitter 2 is operating, the first controller 25 may fix the voltage Vdc output by the power converter 26.

Here, a case where the voltage Vdc is set to the minimum voltage in the voltage range that can be output by the power converter 26 will be described as an example. At this voltage Vdc, the DC electric power Pdc has a characteristic C1 shown in FIG. 7. The characteristics C1 to C4 shown in FIG. 7 are frequency characteristics of the DC electric power Pdc at different voltages Vdc. As the voltage Vdc increases, the frequency characteristic of the DC electric power Pdc is changed in the order of the characteristic C1, the characteristic C2, the characteristic C3, and the characteristic C4. In other words, as the voltage Vdc increases, the driving frequency f for obtaining the same DC electric power Pdc increases.

Subsequently, the first controller 25 performs the frequency control (step S3) to bring the first power measurement value close to the first power command value. Here, the first power measurement value (the power value of the DC electric power Pdc) changes along the characteristic C1 as the driving frequency f is changed. When the power transmitter 2 is activated, the driving frequency f before the frequency control is performed is set to a frequency (for example, 90 kHz) at which the DC electric power Pdc becomes the smallest. When the power transmitter 2 is in operation, the driving frequency f used until immediately before may be used as it is. The first controller 25 gradually brings the first power measurement value close to the first power command value, for example, by changing the driving frequency f step by step. The first controller 25 may increase the variation amount of the driving frequency f per step in a frequency band where the variation amount of the DC electric power Pdc with respect to the variation amount of the driving frequency f is small.

As shown in FIG. 7, in the process of causing the first power measurement value to match the first power command value, the driving frequency f may be temporarily included in the used frequency band (in this example, the used frequency band FB2). However, since the driving frequency f is included in the used frequency band FB2 for a relatively short time, the influence on other devices is limited.

Then, the first controller 25 determines whether or not the first power measurement value has reached (matches) the first power command value (step S4). When it is determined that the first power measurement value has not reached (does not match) the first power command value (step S4; NO), the first controller 25 continues to perform the frequency control of the step S3. On the other hand, when it is determined that the first power measurement value has reached (matches) the first power command value (step S4; YES), the first controller 25 reads the used frequency band information from the memory (not shown) and determines whether or not the frequency f0 of the driving frequency f is included in any of the used frequency bands (step S5). The frequency f0 is a driving frequency f when the power value of the DC electric power Pdc reaches the first power command value in the characteristic C1.

When it is determined that the frequency f0 is not included in any of the used frequency bands (step S5; NO), a series of processes of the power control ends. On the other hand, when it is determined in step S5 that the frequency f0 is included in any of the used frequency bands (step S5; YES), the first controller 25 performs a frequency change process (step S6) for setting the driving frequency f to be outside the used frequency band. The frequency change process is a process of changing the driving frequency f to a frequency different from the used frequency band while performing the constant power control by the frequency control.

In the frequency change process of step S6, as shown in FIG. 6, first, the first controller 25 performs the voltage control of the DC electric power Pdc while performing the constant power control by the frequency control (step S11). To be specific, the first controller 25 controls the power converter 26 to change the magnitude of the voltage Vdc. In step S2, when the voltage Vdc is set to the minimum voltage in the voltage range of the voltage Vdc that can be output by the power converter 26, the first controller 25 controls the power converter 26 to increase the voltage Vdc. The first controller 25 gradually changes the voltage Vdc step by step, for example.

At this time, the frequency characteristic changes according to the magnitude of the voltage Vdc. Therefore, when the driving frequency f is maintained at the frequency f0, the power value (first power measurement value) of the DC electric power Pdc becomes a value different from the first power command value. However, since the first controller 25 performs the constant power control using the frequency control, the first controller 25 controls the power converter 26 so as to change the magnitude of the voltage Vdc and maintains a state in which the first power measurement value matches the first power command value by changing the driving frequency f.

Subsequently, the first controller 25 determines whether or not the driving frequency f becomes a frequency outside the used frequency band (step S12). When it is determined that the driving frequency f is not any frequency outside the used frequency band, that is, the driving frequency f is included in the used frequency band (step S12; NO), the first controller 25 determines whether or not the voltage Vdc can be changed (step S13). For example, as shown in FIG. 7, when the voltage Vdc is increased from the minimum voltage in the voltage range of the voltage Vdc that can be output by the power converter 26, the voltage Vdc can be further increased if the voltage Vdc does not reach the maximum voltage in the voltage range. In such a case, the first controller 25 determines that the voltage Vdc can be changed (step S13; YES), and then performs the process of step S11 again.

In the example of FIG. 7, the frequency characteristic of the DC electric power Pdc is changed to the characteristic C2 by increasing the voltage Vdc. However, in the characteristic C2, the driving frequency f when the power value of the DC electric power Pdc matches the first power command value is included in the used frequency band FB1. Therefore, the voltage Vdc is further increased.

On the other hand, in the above-described case, if the voltage Vdc reaches the maximum voltage of the voltage range, the voltage Vdc cannot be further increased. In such a case, the first controller 25 determines that the voltage Vdc cannot be changed (step S13; NO), changes the first power command value (step S14), and then performs the process of step S11 again. For example, the first controller 25 changes (lowers) the first power command value so that the driving frequency f is set to a frequency outside the used frequency band in a range in which the voltage Vdc can be changed.

On the other hand, when it is determined in step S12 that the driving frequency f becomes a frequency outside the used frequency band (step S12; YES), a series of processes of the power control ends. In the example of FIG. 7, the frequency characteristic of the DC electric power Pdc is changed to the characteristic C4 by increasing the voltage Vdc. In the characteristic C4, the driving frequency f (frequency f1) when the power value of the DC electric power Pdc matches the first power command value is outside the used frequency band FB1.

For example, in the case where the load L is a battery, the battery voltage (load voltage Vout) increases as the charging of the battery proceeds. In this case, although the frequency characteristic of the DC electric power Pdc changes, the driving frequency f changes because the constant power control by the frequency control is performed. At this time, whether the driving frequency f increases or decreases is determined according to the configuration of the resonance circuit or the like. When the driving frequency f increases, the driving frequency f moves away from the used frequency band FB1. In this case, if the first power command value is decreased in step S14, the first controller 25 may increase the first power command value to the original value in a step-by-step manner. When the driving frequency f decreases, the driving frequency f approaches the used frequency band FB1. Therefore, the first controller 25 may further decrease the first power command value so that the driving frequency f is not included in the used frequency band FB1. When the driving frequency f decreases to some extent, the first power command value may be smaller than the lower limit frequency of the used frequency band FB1 even if the first power command value is the original value. Therefore, the first controller 25 may return the first power command value to the original value when the decrease amount of the driving frequency f exceeds a preset threshold value.

As described above, in the power transmitter 2, the frequency change process is performed when the driving frequency f (frequency f0) of the AC electric power Pac2 at the time when the power value (first power measurement value) of the DC electric power Pdc reaches the first power command value is included in the used frequency band used by another device. In the frequency change process, the driving frequency f is changed so that the driving frequency f becomes a frequency different from the used frequency band while performing the constant power control for maintaining a state in which the power value of the DC electric power Pdc matches the first power command value. As described above, once the power value of the DC electric power Pdc reaches the first power command value, the state in which the power value of the DC electric power Pdc matches the first power command value is maintained. Therefore, even if the driving frequency f is changed after the power value of the DC electric power Pdc reaches the first power command value, the power value of the DC electric power Pdc matches the first power command value. As a result, it is possible to shorten the response time from when the second power command value is received to when the power value of the DC electric power Pdc matches the first power command value while suppressing interference with other devices.

In the above-described embodiment, the first controller 25 performs the frequency change process by performing the voltage control of the DC electric power Pdc together with the frequency control. When the voltage Vdc of the DC electric power Pdc is changed, the frequency characteristic of the DC electric power Pdc is changed. Therefore, the driving frequency f is changed in order to maintain a state in which the power value of the DC electric power Pdc matches the first power command value. Thus, the driving frequency f can be set to a frequency different from the used frequency band.

In the above-described embodiment, the first controller 25 sets the voltage Vdc to the minimum voltage within the voltage range that can be output by the power converter 26. Therefore, the first controller 25 performs the voltage control of the DC electric power Pdc by increasing the voltage Vdc in the frequency change process. In this case, since the voltage Vdc is increased in order from a lower voltage, it is possible to lower the voltage Vdc when the driving frequency f is changed to a frequency different from the used frequency band. The lower the voltage Vdc is, the higher the power transfer efficiency between the first coil 21 and the second coil 31 is. Therefore, the power transfer efficiency between the first coil 21 and the second coil 31 can be improved. By lowering the voltage Vdc, the possibility of breakdown of the power transmitter 2 can be reduced.

When the first controller 25 cannot change the driving frequency f to any frequency different from the used frequency band, the first controller 25 lowers the first power command value and then performs frequency change process. Thus, the driving frequency f can be changed to a frequency different from the used frequency band. Therefore, it is possible to more reliably suppress interference with other devices.

When the gap between the first coil 21 and the second coil 31 varies, the load electric power Pout may vary. In the case where the load L is a battery, when the load voltage Vout varies in accordance with the SOC of the battery, the load electric power Pout may also vary. On the other hand, since the first controller 25 performs the constant power control after the power value of the DC electric power Pdc reaches the first power command value, it is possible to follow the transient response as described above.

Although the embodiments of the present disclosure have been described above, the present disclosure is not limited to the above-described embodiments. For example, the wireless power transfer system 1 may be applied not only to the electric vehicle EV but also to a moving body such as a plug-in hybrid vehicle or an underwater vehicle, or may be applied to a device other than the moving body.

Figure 8:
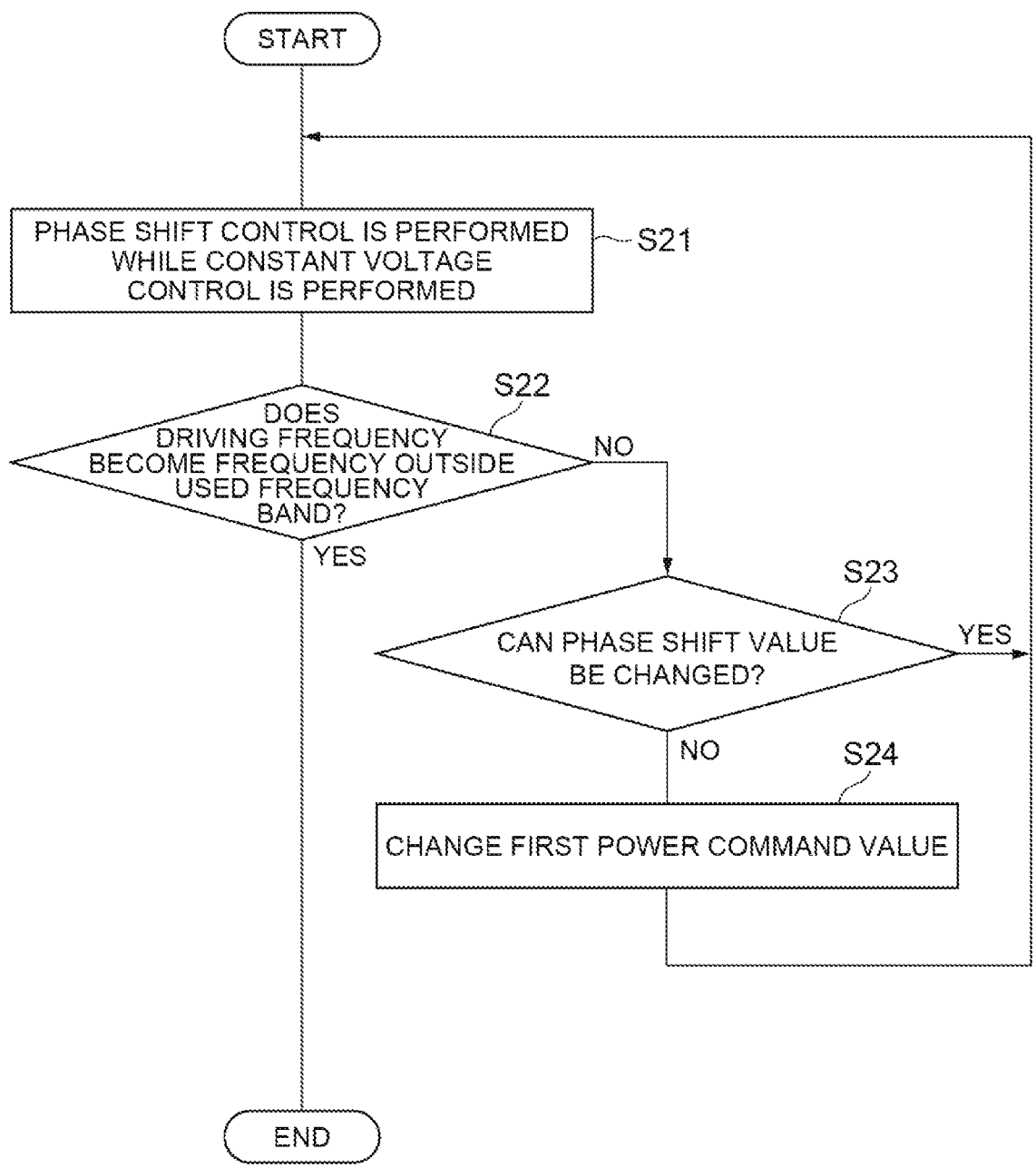
FIG. 8 is a flowchart showing another example of the frequency change process of FIG. 5 in detail.
Figure 9:
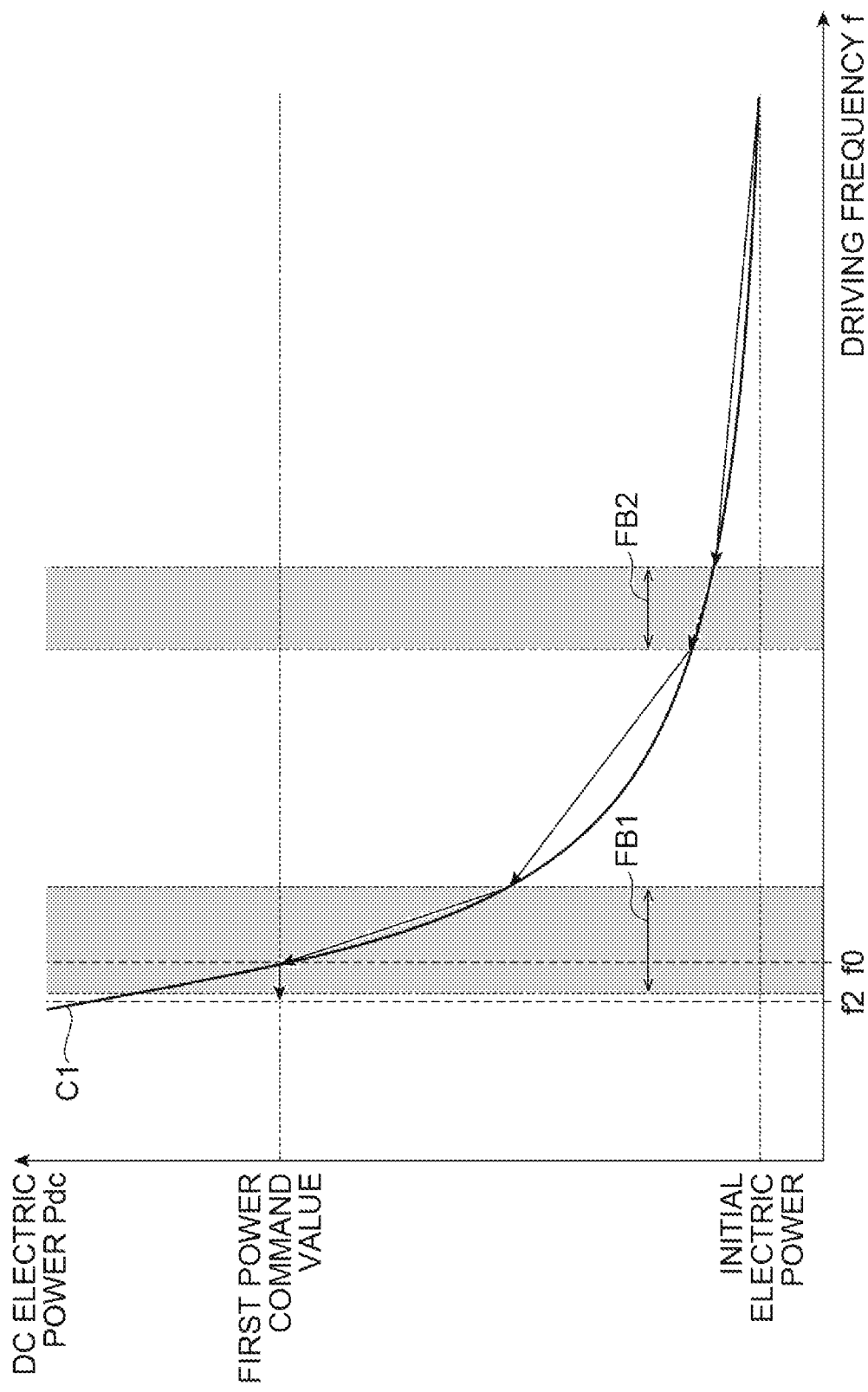
FIG. 9 is a diagram for describing power control including the frequency change process of FIG. 8.

The first controller 25 may perform the frequency change process by performing the phase shift control together with the frequency control instead of the voltage control of the DC electric power Pdc. The power control of a modification will be described with reference to FIGS. 5, 8, and 9. FIG. 8 is a flowchart showing another example of the frequency change process of FIG. 5 in detail. FIG. 9 is a diagram for describing power control including the frequency change process of FIG. 8. The initial value of the phase shift amount of the DC/AC converter 27 is set to 0.

In the power control of the modification, steps S1 to S5 are the same as steps S1 to S5 of the power control of the above-described embodiment. In this modification, a case where the voltage Vdc is set (fixed) to the minimum voltage in the voltage range that can be output by the power converter 26 will be described as an example.

Subsequently, the first controller 25 performs the frequency change process (step S6). In the frequency change process in step S6, as shown in FIG. 8, first, the first controller 25 performs the phase shift control of the DC/AC converter 27 while performing the constant power control by the frequency control (step S21). To be specific, the first controller 25 changes the phase shift amount by adjusting the supply time of the driving signals Sa to Sd (see FIG. 4). Since the initial value of the phase shift amount is set to 0, the first controller 25 increases the phase shift amount. For example, the first controller 25 gradually changes the phase shift amount step by step.

At this time, the frequency characteristic of the DC electric power Pdc changes in accordance with the phase shift amount. Therefore, when the driving frequency f is maintained at the frequency f0, the power value (first power measurement value) of the DC electric power Pdc becomes a value different from the first power command value. For example, when the phase shift amount is increased, the power value of the DC electric power Pdc decreases even if the DC/AC converter 27 is driven at the same driving frequency f. However, since the first controller 25 performs the constant power control using the frequency control, the first controller 25 maintains a state in which the first power measurement value matches the first power command value by changing (decreasing) the driving frequency f while changing the phase shift amount.

Subsequently, the first controller 25 determines whether or not the driving frequency f becomes a frequency outside the used frequency band (step S22). When it is determined that the driving frequency f is not any frequency outside the used frequency band, that is, the driving frequency f is included in the used frequency band (step S22; NO), the first controller 25 determines whether or not the phase shift amount can be changed (increased) (step S23). If the phase shift amount has not reached the maximum value, the phase shift amount can be further increased. In such a case, the first controller 25 determines that the phase shift amount can be changed (step S23; YES), and then performs the process of step S21 again.

On the other hand, if the phase shift amount reaches the maximum value, the phase shift amount cannot be further increased. In such a case, the first controller 25 determines that the phase shift amount cannot be changed (step S23; NO), changes the first power command value (step S24), and then performs the process of step S21 again. For example, the first controller 25 lowers the first power command value so that the driving frequency f is set to a frequency outside the used frequency band within a range in which the phase shift amount can be changed.

On the other hand, when it is determined in step S22 that the driving frequency f becomes a frequency outside the used frequency band (step S22; YES), a series of processes of the power control ends. In the example of FIG. 9, the frequency characteristic of the DC electric power Pdc is changed by increasing the phase shift amount. The driving frequency f (frequency f2) in the case where the power value of the DC electric power Pdc matches the first power command value in this characteristic is smaller than the driving frequency f (frequency f0) in the case where the power value of the DC electric power Pdc matches the first power command value in the characteristic C1, and is outside the used frequency band FB1.

For example, in the case where the load L is a battery, the battery voltage (load voltage Vout) increases as the charging of the battery proceeds. In this case, although the frequency characteristic of the DC electric power Pdc changes, the driving frequency f changes because the constant power control by the frequency control is performed. When the driving frequency f decreases, the driving frequency f moves away from the used frequency band FB1. In this case, the first controller 25 may reduce the phase shift amount in a step-by-step manner. On the other hand, when the driving frequency f increases, the driving frequency f approaches the used frequency band FB1. Therefore, the first controller 25 may further increase the phase shift amount so that the driving frequency f is not included in the used frequency band FB1. Process similar to that of the above-described embodiment may be performed as process in a case where the frequency characteristic of the DC electric power Pdc has changed.

In this modification, when the phase shift amount of the DC/AC converter 27 is changed, the frequency characteristic of the DC electric power Pdc is changed. Therefore, the driving frequency f is changed in order to maintain a state in which the power value of the DC electric power Pdc matches the first power command value. Thus, the driving frequency f can be set to a frequency different from the used frequency band. As described above, also in the power transmitter 2 of the modification, the same effects as those of the power transmitter 2 according to the embodiment are obtained.

In the above modification, the first controller 25 controls the power converter 26 to keep the voltage Vdc constant. Specifically, the voltage Vdc is set to a low voltage such as the minimum voltage in the voltage range that can be output by the power converter 26. According to this configuration, the frequency change process can be performed without increasing the withstand voltage of the DC/AC converter 27. As a result, it is possible to suppress interference with other devices without increasing the size of the DC/AC converter 27. Since a component having a low withstand voltage can be used for the DC/AC converter 27, the cost of the power transmitter 2 can be reduced.

When a switching element having a high withstand voltage is used as the switching element of the DC/AC converter 27, the on-resistance of the switching element increases, and thus the loss in the DC/AC converter 27 increases. Therefore, by using a switching element having a low withstand voltage, it is possible to reduce a decrease in the power efficiency of the power transmitter 2.

Further, in the above modification, since the voltage Vdc is not changed, it is possible to follow a transient response such as a gap variation.

The lower the voltage Vdc is, the higher the power transfer efficiency between the first coil 21 and the second coil 31 is. Therefore, the power transfer efficiency between the first coil 21 and the second coil 31 can be improved by lowering the voltage Vdc. By lowering the voltage Vdc, the possibility of breakdown of the power transmitter 2 can be reduced.

Although the voltage Vdc can be further lowered by lowering the voltage Vac1 of the AC electric power Pac1, the voltage range of the voltage Vac1 is narrowed. On the other hand, the power converter 26 can further lower the voltage Vdc without narrowing the voltage range of the voltage Vac1 by further including a step-down DC/DC converter in the subsequent stage of the PFC circuit. When the voltage Vdc is set within the voltage range that can be output from the PFC circuit, the step-down DC/DC converter can be omitted. Therefore, the cost of the power transmitter 2 can be reduced. In the above modification, the voltage Vdc may be changed by about several volts.

Figure 10:
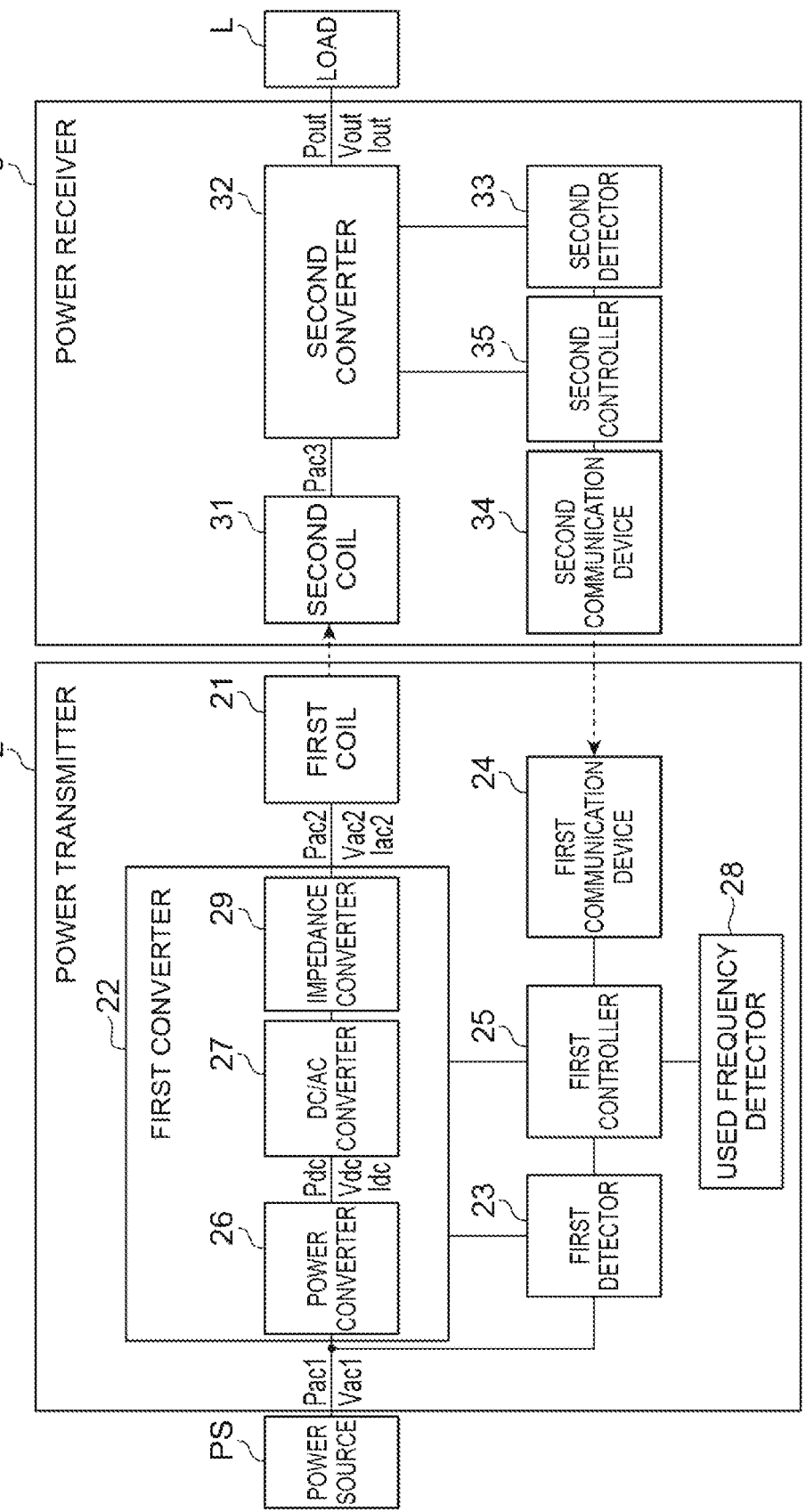
FIG. 10 is a circuit block diagram of a wireless power transfer system including a power transmitter according to a modification.

The first controller 25 may perform the frequency change process by performing the impedance control together with the frequency control. With reference to FIG. 10, a wireless power transfer system 1 including a power transmitter 2 of another modification will be described. FIG. 10 is a circuit block diagram of a wireless power transfer system including a power transmitter according to another modification. As shown in FIG. 10, the wireless power transfer system 1 according to another modification is mainly different from the wireless power transfer system 1 of the above-described embodiment in that the first converter 22 of the power transmitter 2 further includes an impedance converter 29.

The impedance converter 29 is provided between the DC/AC converter 27 and the first coil 21. The impedance converter 29 is a device for changing the impedance between the DC/AC converter 27 and the first coil 21 (impedance viewed from the DC/AC converter 27). The impedance converter 29 may be, for example, a tunable matching network (TMN). Since the TMN is known, a description thereof is omitted (refer to U.S. Patent Application Publication 2019/0006836, U.S. Patent Application Publication 2019/0006885, and the like).

The first converter 22 can change the magnitudes (power values) of the DC electric power Pdc and the AC electric power Pac2 by the impedance control in addition to the frequency control, the phase shift control, and the voltage control of the DC electric power Pdc. That is, the power control performed by the first controller 25 is performed by using at least one of the frequency control, the phase shift control, the voltage control of the DC electric power Pdc, and the impedance control.

Next, the impedance control will be described. The first controller 25 performs the impedance control of changing the magnitudes (power values) of the DC electric power Pdc, the AC electric power Pac2, and the load electric power Pout by changing the magnitude of the impedance between the DC/AC converter 27 and the first coil 21. The DC electric power Pdc and the AC electric power Pac2 decrease as the impedance between the DC/AC converter 27 and the first coil 21 increases, and the DC electric power Pdc and the AC electric power Pac2 increase as the impedance between the DC/AC converter 27 and the first coil 21 decreases. Therefore, the above-described power control parameter in the impedance control is the magnitude of the impedance between the DC/AC converter 27 and the first coil 21.

The power control of another modification differs from the power control of the above-described modification in that the impedance control is used instead of the phase shift control. Therefore, a detailed description thereof is omitted.

In this modification, when the impedance between the DC/AC converter 27 and the first coil 21 is changed, the frequency characteristic of the DC electric power Pdc is changed. Therefore, the driving frequency f is changed in order to maintain a state in which the power value of the DC electric power Pdc matches the first power command value. Thus, the driving frequency f can be set to a frequency different from the used frequency band. As described above, also in the power transmitter 2 of another modification, the same effects as those of the power transmitter 2 according to the modification described above are obtained. The impedance converter 29 may be provided between the second coil 31 and the second converter 32.

The first controller 25 may select one of the voltage control of the DC electric power Pdc and the phase shift control in accordance with the driving frequency f (frequency f0) when the power value of the DC electric power Pdc reaches the first power command value, and may perform the frequency change process by performing the selected control together with the frequency control. For example, it is assumed that the voltage Vdc is set to the minimum voltage in the voltage range that can be output by the power converter 26 and the phase shift amount is set to 0 before the frequency change process is performed. In this case, in order to maintain the state in which the power value of the DC electric power Pdc matches the first power command value, the driving frequency f can only be increased in the frequency change process by the power control of the DC electric power Pdc and the frequency control, and the driving frequency f can only be decreased in the frequency change process by the phase-shift control and the frequency control.

For example, the first controller 25 selects one of the power control of the DC electric power Pdc and the phase shift control of the DC/AC converter 27 in consideration of criteria such as whether the power value of the DC electric power Pdc can be caused to match the first power command value, whether the impedance of the entire load viewed from the DC/AC converter 27 (inverter circuit) becomes capacitive (C load) by the phase shift control, whether there is the influence of noise such as electromagnetic compatibility (EMC) and malfunction by the phase shift control, and whether the driving frequency f increases or decreases when the frequency characteristic of the DC electric power Pdc changes due to progress of power transfer. Here, the impedance of the entire load viewed from the DC/AC converter 27 (inverter circuit) in the present modification is the sum of the impedances of the impedance converter 29, the first coil 21, the second coil 31, the second converter 32, and the load L. For example, when the impedance of the entire load viewed from the DC/AC converter 27 (inverter circuit) is capacitive, the first controller 25 selects the voltage control of the DC electric power Pdc. When there is an influence of noise, the first controller 25 selects the voltage control of the DC electric power Pdc. Alternatively, the first controller 25 selects control in which the driving frequency f moves away from the used frequency band when the frequency characteristic of the DC electric power Pdc changes.

This makes it possible to shorten the time until the driving frequency f is set to a frequency different from the used frequency band. Since the adjustment range of the driving frequency f can be widened by using the voltage control and the phase shift control, it is possible to more reliably set the driving frequency f to a frequency different from the used frequency band. Furthermore, it is possible to stabilize charging control while reducing the influence of noise without performing control for suppressing noise.

Similarly, the first controller 25 may select one of the voltage control of the DC electric power Pdc and the impedance control in accordance with the driving frequency f (frequency f0) when the power value of the DC electric power Pdc reaches the first power command value, and may perform the frequency change process by performing the selected control together with the frequency control. For example, it is assumed that before the frequency change process is performed, the voltage Vdc is set to the minimum voltage in the voltage range that can be output by the power converter 26, and the impedance between the DC/AC converter 27 and the first coil 21 is set to the minimum. In this case, in order to maintain the state in which the power value of the DC electric power Pdc matches the first power command value, the driving frequency f can only be increased in the frequency change process by the power control and the frequency control, and the driving frequency f can only be decreased in the frequency change process by the impedance control and the frequency control.

The criterion for selecting one of the voltage control of the DC electric power Pdc and the impedance control is the same as the criterion for selecting one of the voltage control of the DC electric power Pdc and the phase shift control. This makes it possible to shorten the time until the driving frequency f is set to a frequency different from the used frequency band. Since the adjustment range of the driving frequency f can be widened by using the voltage control and the impedance control, it is possible to more reliably set the driving frequency f to a frequency different from the used frequency band. Furthermore, it is possible to stabilize charging control while reducing the influence of noise without performing control for suppressing noise.

As described above, the first controller 25 performs the frequency change process by performing at least one of the voltage control of the DC electric power Pdc, the phase shift control of the DC/AC converter 27, and the impedance control between the DC/AC converter 27 and the first coil 21 together with the frequency control. When the voltage Vdc, the phase shift amount of the DC/AC converter 27, or the impedance between the DC/AC converter 27 and the first coil 21 is changed, the frequency characteristic of the DC electric power Pdc is changed. Therefore, the driving frequency f is changed in order to maintain a state in which the power value of the DC electric power Pdc matches the first power command value. Thus, the driving frequency f can be set to a frequency different from the used frequency band.

As described above, the first controller 25 may control the first converter 22 so that the AC electric power Pac2 approaches the first power command value, which is the target value of the AC electric power Pac2, as the constant power control. The AC electric power Pac2 has the same frequency characteristic as that of the DC electric power Pdc. The power control using the AC electric power Pac2 is the same as the power control using the DC electric power Pdc.

REFERENCE SIGNS LIST 1 wireless power transfer system
2 power transmitter
3 power receiver
4 first coil device
5 second coil device
21 first coil
22 first converter (converter)
23 first detector
24 first communication device
25 first controller (controller)
26 power converter
27 DC/AC converter
28 used frequency detector
29 impedance converter
31 second coil
32 second converter
33 second detector
34 second communication device
35 second controller
SWa switching element
SWb switching element
SWc switching element
SWd switching element
EV electric vehicle
FB1 used frequency band
FB2 used frequency band
Idc electric current
Iout load electric current
L load
Pac1 AC electric power
Pac2 AC electric power
Pac3 AC electric power
Pdc DC electric power
Pout load electric power
PS power source
R road surface Sa driving signal
Sb driving signal
Sc driving signal
Sd driving signal
Vdc voltage
Vout load voltage

The invention claimed is:

1. A power transmitter for supplying electric power to a power receiver connected to a load, the power transmitter comprising:
- a first coil configured to wirelessly transmit the electric power to a second coil of the power receiver;
- a converter including a DC/AC converter configured to convert DC electric power into AC electric power and supply the AC electric power to the first coil; and
- a controller configured to bring a power value of target electric power close to a power command value by frequency control of changing a frequency of the AC electric power,
- wherein the target electric power is the DC electric power or the AC electric power,
- wherein the controller performs, when the frequency at which the power value reaches the power command value is included in a used frequency band used by another device, frequency change process of changing the frequency so that the frequency becomes a frequency different from the used frequency band while performing constant power control of maintaining a state in which the power value matches the power command value, and
- wherein the controller:
  - selects one of voltage control of changing a voltage of the DC electric power and phase shift control of the DC/AC converter in accordance with the frequency when the power value reaches the power command value, and
  - performs the frequency change process by performing the selected control together with the frequency control.

2. The power transmitter according to claim 1,
wherein the controller performs the voltage control by increasing the voltage when the voltage control is performed together with the frequency control.

3. The power transmitter according to claim 1,
wherein the controller controls the converter to keep the voltage constant when the phase shift control is performed together with the frequency control.

4. The power transmitter according to claim 1, wherein the controller decreases the power command value when the controller cannot change the frequency to any frequency different from the used frequency band.

5. A power transmitter for supplying electric power to a power receiver connected to a load, the power transmitter comprising:
- a first coil configured to wirelessly transmit the electric power to a second coil of the power receiver;
- a converter including a DC/AC converter configured to convert DC electric power into AC electric power and supply the AC electric power to the first coil; and
- a controller configured to bring a power value of target electric power close to a power command value by frequency control of changing a frequency of the AC electric power,
- wherein the target electric power is the DC electric power or the AC electric power,
- wherein the controller performs, when the frequency at which the power value reaches the power command value is included in a used frequency band used by another device, frequency change process of changing the frequency so that the frequency becomes a frequency different from the used frequency band while performing constant power control of maintaining a state in which the power value matches the power command value, and
- wherein the controller:
  - selects one of voltage control of changing a voltage of the DC electric power and impedance control of controlling an impedance between the DC/AC converter and the first coil in accordance with the frequency when the power value reaches the power command value, and
  - performs the frequency change process by performing the selected control together with the frequency control.

6. The power transmitter according to claim 5, wherein the controller controls the converter to keep the voltage constant when the impedance control is performed together with the frequency control.

* * * * *